Patented Nov. 12, 1929

1,735,157

UNITED STATES PATENT OFFICE

STEWART J. CARROLL, OF ROCHESTER, NEW YORK, ASSIGNOR TO EASTMAN KODAK COMPANY, OF ROCHESTER, NEW YORK, A CORPORATION OF NEW YORK

CELLULOSE-ETHER COMPOSITION

No Drawing. Application filed October 7, 1925. Serial No. 61,141.

This invention relates to a composition of matter in which cellulose ether is combined or mixed with other substances, so that the resulting product can be advantageously used in the plastic and analogous arts, such for instance as sheet or film manufacture and varnish manufacture.

One object of the invention is to provide a composition which may be made into permanently transparent, strong and flexible sheets or films of desired thinness, which are substantially water-proof, are unaffected by ordinary photographic fluids, and possess the desired properties of a support for light-sensitive photographic coatings. Another object of my invention is to produce a composition capable of easy manipulation in the plastic and film-making or varnish making or allied arts; but will not injure or be injured by the substances with which it is associated during manufacture, storage or use. Still another object of my invention is to provide a film having the hereinabove described properties. Other objects will hereinafter appear.

I have found that a composition having the desirable qualities hereinabove enumerated can be obtained by mixing or compounding cellulose ether say for example an alkyl ether of the type described in U. S. Patent No. 1,188,376, June 20, 1916, Leon Lilienfeld, with one or more of the mono alkyl ethers of ethylene glycol in which the alkyl group contains less than 6 carbon atoms, say for example, the mono methyl ether of ethylene glycol, the mono ethyl ether of ethylene glycol and mixtures of them in various proportions. I prefer the simpler members of the series although the corresponding propyl, butyl and amyl ethers can be employed.

Inherently the mono alkyl ethers of ethylene glycol are nonsolvents of cellulose ether, by which I mean that they will precipitate cellulose ether from its solutions in organic solvents if enough of them is added to said solution.

This mixing to a colloidized state is preferably performed with the aid of a common solvent. While the details of one way of carrying out my invention will be given by way of example, it will be understood that my invention is not restricted thereto, except as indicated in the appended claim.

In carrying out one embodiment of my invention, 100 parts of water-insoluble ethyl cellulose are dissolved along with from 5 to 75 parts of either mono ethyl or mono methyl ether of ethylene glycol or a mixture of them, (say for instance 20 parts) in from 300 to 500 parts of a volatile common solvent. The latter may usefully comprise a mixture of methyl-acetate and methyl alcohol, the weight of methyl acetate being approximately nine times the weight of the alcohol. This composition is suitable for spreading upon a film-forming surface in a coating, from which the volatile solvent evaporates sufficiently to leave a transparent flexible sheet, which is stripped off and otherwise treated in the way well known in this art. The parts are by weight. The transparency and flexibility indicates that the cellulose ether and the mono alkyl ether of ethylene glycol remain in the colloidized state without precipitating each other.

Where a more readily flowable composition is desired, the amount of volatile solvent may be increased until the desired results are obtained. Benzol and ethyl or methyl alcohol may be added in thinning it out. Of course, other equivalent volatile solvent mixtures may be substituted. Moreover, ingredients which impart characteristic properties to the film may likewise be added, such as triphenyl phosphate, tricresyl phosphate, camphor, monochlornaphthalene, etc. The proportions of these substances, or mixtures of them should not be sufficient to cause precipitation of the ether, or to cause white films or varnish coatings to be produced. The ingredients are of the commercial type and sufficiently purified for the ends in view. Where the dope is to be made into sheets or films for photographic purposes, the substances are chosen or purified to have the proper relative freedom from color.

Having thus described my invention, what I claim as new and desire to secure by Letters Patent is:—

As an article of manufacture, a film comprising water-insoluble alkyl cellulose and at least one compound selected from the group of monoalkyl ethers of ethylene glycol, in which the alkyl group contains less than six carbon atoms, said film being prepared from a composition containing from 5 to 75 parts by weight of said compound to each 100 parts of alkyl cellulose, the proportions of the ingredients being such that the film is flexible and transparent.

Signed at Rochester, New York, this 30th day of September, 1925.

STEWART J. CARROLL.